Patented Aug. 5, 1947

2,425,287

UNITED STATES PATENT OFFICE 2,425,287

ARYL CARBOXYGUANAMINES

Jack Theo Thurston, Riverside, and Daniel Elmer Nagy, Stamford, Conn., assignors to American Cyanamid Company, New York, N. Y., a corporation of Maine No Drawing. Application June 19, 1942, Serial No. 447,738

8 Claims. (Cl. 260—249.5)

This invention relates to guanamines in which the 2-carbon atom of the 4,6-diamino-1,3,5-triazine ring contains as the substituent group an aryl carboxylic acid.

The guanamines of the present invention are of particular significance as they react with formaldehyde to form resins which are soluble in aqueous alkaline medium and can be applied to materials as textile finishes which on curing by heat are transformed from a water-soluble to a water-insoluble form and when incorporated with other aldehyde resin-forming compounds having a hydrophobic group they serve as water repellents for textiles and paper. An important characteristic of these finishes is that the water-repellency is effected without objectionable stiffening of the goods. In other words, the finish does not form a continuous film from fiber to fiber.

The products of the present invention can be produced by various methods and the invention is not limited to any particular method of preparation. Two processes are, however, preferred because of their simplicity and cheapness. In one process a dibasic acid ester is combined with two moles of a biguanide, preferably in a solvent, and the product is isolated as the biguanide salt or ester of a carboxy guanamine. A similar result can be effected by reacting an alkali metal salt of a half ester of a dibasic acid with a biguanide in which case the sodium salt of the carboxy substituted guanamine is obtained.

The most important products of the present invention are the ones prepared from biguanide itself. In these products the amino groups of the triazine ring are unsubstituted and the products can be prepared with best yields and simplest procedures. However, the present invention also includes products prepared from substituted biguanides such as phenyl biguanide, allyl biguanide or dimethyl biguanide, in which cases the correspondingly substituted guanamines are obtained. When substituted biguanides are reacted, the reaction does not proceed as rapidly and as completely and it is sometimes desirable to add a condensing agent such as a metal alkoxide to facilitate the reaction. The products derived from unsubstituted biguanide can usually be prepared without condensing agents but in some cases it may be desirable to accelerate the reaction by the use of a condensing agent.

In general the preferred process of the present invention operates best in the presence of a suitable solvent for the biguanide and/or the ester. We have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if an alcohol is used as a solvent corresponding to the alcohol radical of the ester, no separation problem arises. Excellent results are, however, obtained with the lower monohydric alcohols such as the ether alcohols, for example, the ethyl ether of ethylene glycol.

The present invention will be described in greater detail in conjunction with the following specific examples which are typical illustrations. The parts are by weight.

*Example 1* o-carboxybenzoguanamine

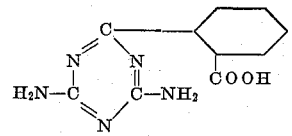

To 30 parts of biguanide dissolved in 100 parts of methanol was added 29 parts of dimethyl phthalate and the reaction mixture was agitated in order to aid crystallization of the product. The biguanide salt of o-carboxybenzoguanamine was removed by filtration and a portion of it was recrystallized from 88% ethyl alcohol. The colorless crystals of the salt melted at 127–128° C. and the o-carboxybenzoguanamine obtained by acidification of an aqueous solution of the salt to a pH of about 4.0 melted at 248–249° C. The yield of the crude salt was about 75%.

*Example 2* o-carboxybenzoguanamine

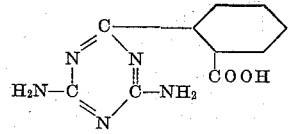

The procedure of Example 1 was followed except that the dimethyl phthalate was substituted by methyl 2-ethylhexyl phthalate. The yield of o-carboxybenzoguanamine was about 65% with traces of the phthaloguanamine having the formula

*Example 3* o-carboxybenzoguanamine

To 25 parts of biguanide dissolved in 100 parts of warm methanol was added 60.6 parts of sodium methyl phthalate and 6 parts of sodium metal dissolved in 200 parts of methanol. The reaction mixture was stirred for several hours and the precipitated product was then filtered from the solvent. The crude sodium salt of o-carboxybenzoguanamine was obtained in a yield of 94%. By acidification of an aqueous solution of the salt the free o-carboxybenzoguanamine melting at 247° C. was obtained in a yield of about 75%.

Disodium salt of sulfonated 2-carboxylic benzoguanamine

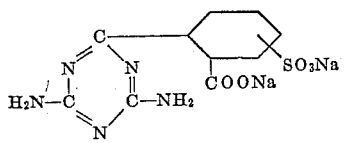

Twenty parts of the sodium salt of diamyl sodium sulfophthalate was added to a solution of 6 parts of biguanide and 1.6 parts of sodium metal dissolved in 60 parts of methanol. A heavy white precipitate formed even before complete solution of the reactions was obtained. The reaction mixture was allowed to stand overnight and the product was removed from the solvent by filtration. The filtrate was evaporated to dryness to remove the methanol and the residue was treated with ethanol to remove amyl alcohol. This material was combined with that originally removed by filtration and slurried with an ethanol solution of sodium ethoxide in order to convert it into the disodium salt of sulfonated 2-carboxybenzoguanamine which was obtained in a yield of about 90%.

*Example 5*

Terephthaloguanamine

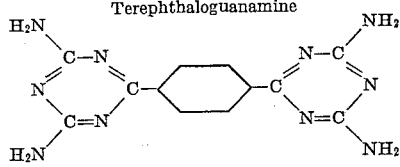

To 50 parts of biguanide dissolved in 300 parts of methanol was added 62 parts of dibutyl terephthalate, which was prepared by esterification of terephthalic acid with butanol. Product began to precipitate in a few minutes and on further standing the solid partially dissolved. The remaining solid amounting to about 38 parts was removed by filtration and extracted with about 3000 parts of hot 5% sulfuric acid and cooled. The crystalline sulfate salt was suspended in water and made slightly alkaline in order to dissolve the small amount of p-carboxybenzoguanamine. The yield of terephthaloguanamine which did not melt at 300° C. was 45%.

*Example 6*

β-(α-carboxynaphthoguanamine)  and  α-(β-carboxynaphthoguanamine)

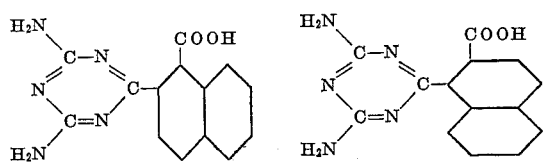

To 50 parts of biguanide dissolved in 160 parts of methanol was added 61 parts of dimethyl 1,2-naphthalene dicarboxylate dissolved in 100 parts of warm methanol. The reaction mixture was stirred for a short time in order to aid crystallization of the product and was then allowed to stand overnight. The biguanide salt of the mixed carboxy α- and β-naphthoguanamines was filtered from the reaction medium, which on concentration gave further amounts of the product. The colorless crystals of the mixed salt were dissolved in water and on acidification to a pH of about 4.0 the mixture of β-(α-carboxynaphthoguanamine) and α-(β-carboxynaphthoguanamine) separated as a colorless and slightly soluble product which did not possess a sharp melting point and decomposed when rapidly heated to a high temperature.

We claim:

1. A method of preparing a carboxyarylguanamine which comprises dissolving a biguanide and a member selected from the group consisting of an alkyl diester and an alkali metal salt of an alkyl half ester of an aryl dicarboxylic acid in a common solvent whereby reaction is instituted and the guanamine precipitates, continuing the reaction until precipitation substantially ceases, and collecting the resultant guanamine.

2. A process according to claim 1 in which the reaction is carried out in a monohydric lower paraffin alcohol.

3. A method of preparing a carboxyarylguanamine which comprises dissolving a biguanide and an alkyl diester of an aryl dicarboxylic acid in a common solvent whereby reaction is instituted and the guanamine precipitates, continuing the reaction until precipitation substantially ceases, and collecting the resultant guanamine.

4. A process according to claim 3 in which the biguanide used is biguanide.

5. A process according to claim 3 in which the reaction is carried out in a monohydric lower paraffin alcohol.

6. A method of preparing a carboxyarylguanamine which comprises dissolving a biguanide and a metal salt of an alkyl half ester of an aryl dicarboxylic acid in a common solvent whereby reaction is instituted with precipitation of the resultant guanamine, continuing the reaction until precipitation substantially ceases, and collecting the resultant guanamine.

7. A procedure according to claim 6 in which the biguanide used is biguanide.

8. A procedure according to claim 6 in which the reaction is carried out in a monohydric lower paraffin alcohol.

JACK THEO THURSTON.
DANIEL ELMER NAGY.

REFERENCES CITED

The following references are of record in the file of this patent:

Monatshafte fur Chemie, vol. 48, page 148.
Annalen, vol. 376, p. 166–7, 180–181.